Figure 1:
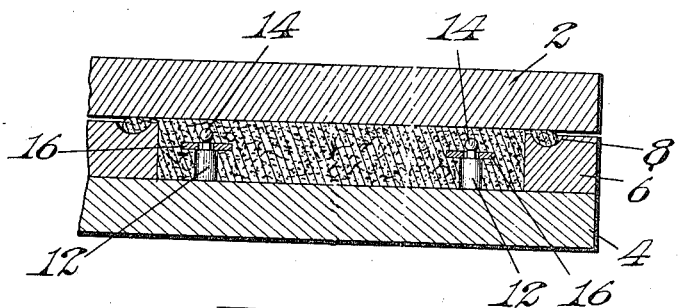

F. J. GLEASON.
METHOD OF TRIMMING RUBBER ARTICLES.
APPLICATION FILED APR. 23, 1915.

1,195,204.

Patented Aug. 22, 1916.

Inventor.
Frederick J. Gleason
By his attorney
Putnam Putnam & Bell

UNITED STATES PATENT OFFICE.

FREDERICK J. GLEASON, OF WALPOLE, MASSACHUSETTS, ASSIGNOR TO STANDARD WOVEN FABRIC COMPANY, OF FRAMINGHAM, MASSACHUSETTS, A CORPORATION OF MASSACHUSETTS.

METHOD OF TRIMMING RUBBER ARTICLES.

1,195,204.     Specification of Letters Patent.     Patented Aug. 22, 1916.

Application filed April 23, 1915. Serial No. 23,491.

*To all whom it may concern:*

Be it known that I, FREDERICK J. GLEASON, a citizen of the United States, residing at Walpole, in the county of Norfolk and State of Massachusetts, have invented certain Improvements in Methods of Trimming Rubber Articles, of which the following description, in connection with the accompanying drawings, is a specification, like reference characters on the drawings indicating like parts in the several figures.

This invention relates to the manufacture of rubber articles, especially to the trimming of such articles, and will be herein disclosed as applied to the manufacture of rubber heels. After articles of this character are molded and vulcanized there usually is left projecting from the perimeter of the article a thin fin of rubber constituting the overflow from the molding operation. It is necessary to remove this fin in order to place the article in a salable condition, and this operation has usually been performed heretofore by cutting off the fin with a knife after the article has been removed from the mold. Inasmuch as rubber does not cut easily at ordinary temperatures, this operation is arduous and relatively expensive.

It is the chief object of the present invention to devise a more expeditious method of trimming articles of this character.

Figure 2:
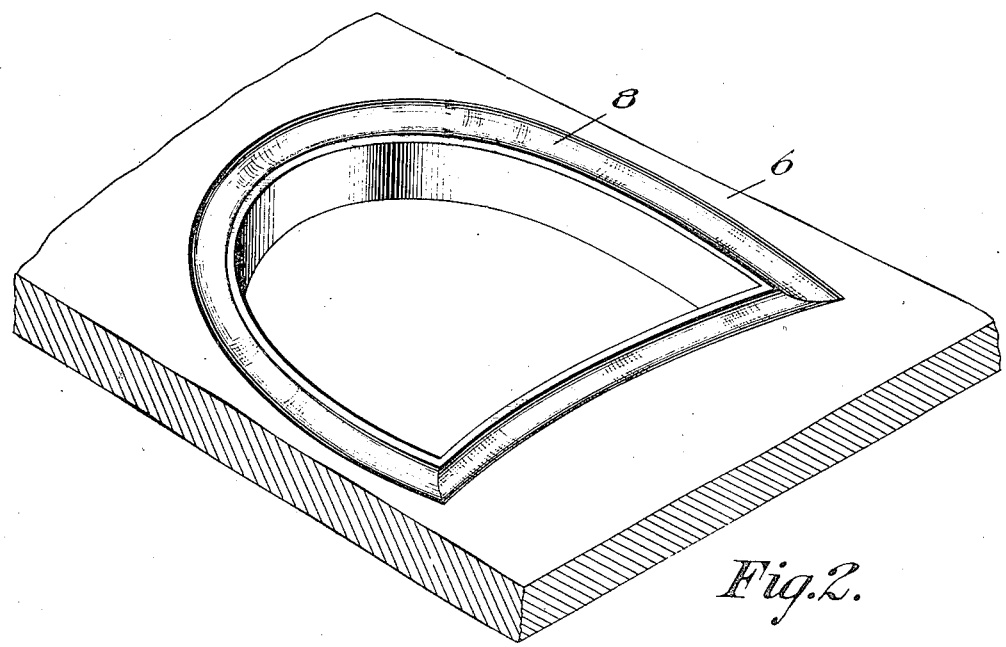
Figure 3:
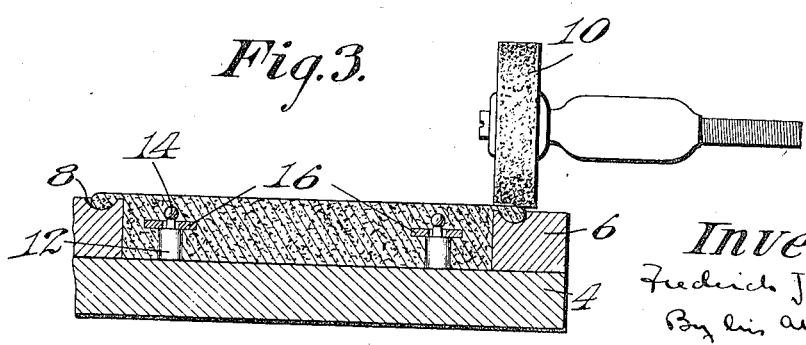

Referring now to the accompanying drawings, Figure 1 is a cross-sectional view of a mold of the character used in the manufacture of rubber heels; Fig. 2 is a perspective view of the middle section of the mold shown in Fig. 1; and Fig. 3 is a view similar to Fig. 1 showing the manner in which it is proposed to remove the fin or other surplus material from the heel.

The molds used in the manufacture of rubber heels usually consist of a top plate 2, a bottom plate 4 and a middle plate or section 6 which has an aperture formed in it of the size and shape of the heel required. The charge of rubber composition is placed in this aperture and the upper plate or die is forced down on the section 6 of the mold with great pressure, the required heat being applied to vulcanize the stock. A slightly larger quantity of stock is used than is actually necessary to make the heel in order to be sure to have the mold well filled. This excess stock is forced out during the molding operation into a groove or gutter 8 formed in the upper face of the part 6 around the aperture, as clearly shown in Figs. 1 and 2. It is this fin or overflow that must be removed after the molding operation is completed.

According to the present method the heel is retained in the mold section 6 after the molding operation has been completed and while the parts are cooling off. Before the heel has cooled sufficiently to become elastic the fin is cut away, preferably by means of an abrading or buffing tool 10. This operation should be performed while the rubber is in the brittle or crumby condition characteristic of this material at certain temperatures and in which condition it cuts very easily.

The upper edge of the section 6 of the mold serves as a guide or templet during the trimming operation, and at the same time this section is partly cleaned by the trimming operation.

Any convenient means may be employed to keep the heel from sticking to the upper plate 2 and pulling out of the mold when this plate is removed. A simple and convenient means for effecting this object consists in forming on the top of each of the posts 12, which project from the lower plate 4, a small knob 14. These posts support in the proper positions in the mold the washers 16 which are to be embedded in the heel and they also form the holes through which the fastenings will be driven to secure the heel on a shoe. The knobs 14 are small enough to pass freely through the holes in the washers 16; but the rubber of the heel flows around the knobs so that the portions of this material between the lower face of each knob and its respective washer 16 operate to fasten the heel yieldingly to the lower plate 14. Any other convenient means, however, may be employed for this purpose. After the trimming operation has been completed and the heel has cooled, the part 6 is separated from the base 4 and the heel is then pulled off the posts 12.

It is obvious that this method is applicable to the manufacture of a great variety of rubber articles.

Having thus described my invention, what

I claim as new and desire to secure by Letters Patent of the United States is:—

1. That improvement in the method of shaping rubber articles which consists in cutting away the surplus material while the article is hot enough to be brittle.

2. That improvement in the method of trimming rubber articles which consists in cutting away the surplus material before the article has cooled, following the molding operation, sufficiently to become elastic.

3. That improvement in the method of shaping rubber articles which consists in removing the surplus material by abrasion while the article is hot enough to be brittle.

4. That improvement in the method of trimming rubber articles which consists in cutting away the surplus material while the article is in the mold in which it has been vulcanized and before the article has cooled sufficiently to become elastic, and utilizing the mold as a guide for the cutting operation.

5. That improvement in the method of trimming rubber articles which consists in holding the article in a part of the mold in which it has been vulcanized and which can be used as a templet, removing the surplus material by abrasion while so utilizing the mold and performing this operation while the rubber is hot enough to cut readily.

In testimony whereof I have signed my name to this specification in the presence of the subscribing witness.

FREDERICK J. GLEASON.

Witness:
  MELROSE D. DAVIES.